Dec. 3, 1968 W. E. FOSTER 3,414,064
ADJUSTABLE ROTARY HOE
Filed Aug. 19, 1965 3 Sheets-Sheet 1
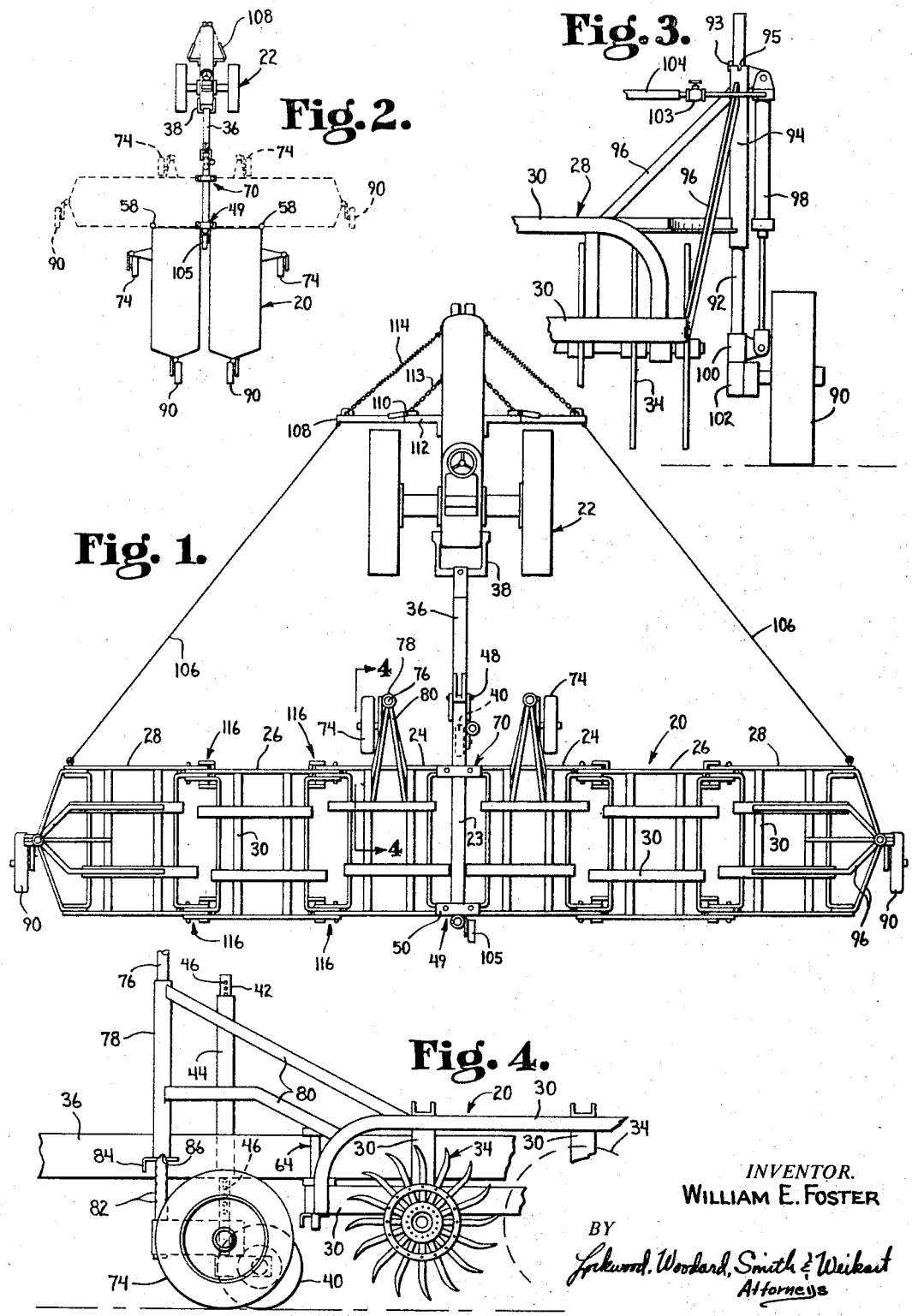
INVENTOR.
WILLIAM E. FOSTER
BY
Lockwood, Woodard, Smith & Weikart
Attorneys Dec. 3, 1968  W. E. FOSTER  3,414,064
ADJUSTABLE ROTARY HOE
Filed Aug. 19, 1965  3 Sheets-Sheet 2

INVENTOR.
WILLIAM E. FOSTER
BY
Lockwood, Woodard, Smith & Weikart
Attorneys

United States Patent Office 3,414,064
Patented Dec. 3, 1968

3,414,064
ADJUSTABLE ROTARY HOE
William E. Foster, R.R. 6, Box 1038,
Kokomo, Ind. 46901
Filed Aug. 19, 1965, Ser. No. 480,907
3 Claims. (Cl. 172—311)

ABSTRACT OF THE DISCLOSURE

A farm implement of the rotary hoe type wherein multiple hoe sections or gangs are so constructed and arranged as to be readily extended to a substantial width for farm or field use, and can be easily retracted to a much lesser width for travel or for storage.

---

This invention relates to implements, and more particularly, in the embodiments illustrated, the invention relates to farm and field implements known as rotary hoes.

More specifically, the invention relates to novel and advantageous concepts relating to the support, control, and positioning of a rotary hoe attachment for tractors.

By concepts of the invention, there is provided a rotary hoe assembly embodying multiple hoe-sections or gangs, which, when positioned to hoe-operating position, extend to a great width, say about twenty-four feet, yet which, when positioned in a retracted position for travel and/or storage, extend only about ten feet, and thus are easily passed through a relatively narrow gate; moreover, the various components are easily disassembled further, providing compactness for prolonged storage, yet are easily and readily reassembled as desired. Concepts for support of the components provide economical and advantageous accommodation to uneven terrain.

Other and more specific advantages and concepts, as well as those mentioned above, are set forth in the following detailed description of illustrative embodiment of rotary hoe assemblies in which the inventive concepts are used, taken in conjunction with the accompanying somewhat diagrammatic drawings, in which:

FIG. 1 is a top or plan view of a rotary hoe assembly according to an illustrative embodiment, shown in hoe-operational position and connected to an associated tractor;

FIG. 2 is a top or plan view thereof, in reduced scale, illustrating the hoe assembly moved from its hoe-operational position (shown in dashed lines) to its retracted position for transport and/or storage;

FIG. 3 is an elevational view of one of the outboard, hydraulically adjustable support wheels;

FIG. 4 is a detail view, in enlarged scale, taken generally as indicated by view-line 4—4 of FIG. 1 and viewed in the direction indicated by the arrows of the said view-line;

Figure 5:
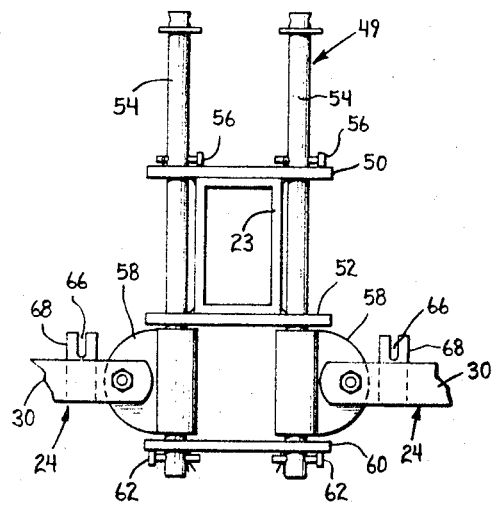
FIG. 5 is a fragmental, rear elevational view, in further enlarged scale, of the central portion of the hoe assembly.

As shown in the drawings, a rotary hoe assembly 20, according to the illustrated embodiment, is attachable to a tractor 22; and general concepts of the invention provide a hoe assembly having desirable characteristics when in a hoeing position and operation, yet which is foldable to a retracted position for transport or storage.

The hoe assembly 20 of the illustrated embodiment is shown as having, on each side of a main longitudinal frame-member 23, three sections or hoe-wheel-carrying gangs, herein referred to as an inner section 24, an intermediate section 26, and an outer section 28. These sections, in the hoe-operational position of the assembly (FIG. 1), are arranged laterally of the hoe assembly 20 and laterally of the direction of travel of the tractor 22, providing the wide swath desired per pass.

Each of the hoe-sections 24, 26, and 28 includes interconnected frame members 30 which support ground-cultivating hoe implements or wheels 34 (FIG. 4) of a type and quantity desired; but the hoe wheels 34 form no part of the present inventive concepts, and thus their nature and details are no further described herein.

A tongue 36 extends forwardly from the hoe 20, for connection to the tractor draw-bar 38; and a wheel 40 shown at the rear end of the tongue 36 and forwardly of the hoe 20 provides part of the support of the hoe 20 in hoe-operational or transport or storage conditions as desired, the wheel 40 being carried on a vertical shaft 42 (FIG. 4) which passes through a vertically-extending sleeve 44 fixed to the tongue 36. A series of holes 46 on shaft 42 permits it to be pinned by a pin (not shown) to the sleeve 44 at whatever height-adjustment is desired, yet the shaft 42 is rotatable to permit directional-turning of the wheel 40.

Forwardly of the wheel 40, the tongue 36 is provided with a hinge 48, permitting the main length of the tongue 36 to be folded back over the hoe 20 for reducing storage space of the assembly when being stored.

Figure 6:
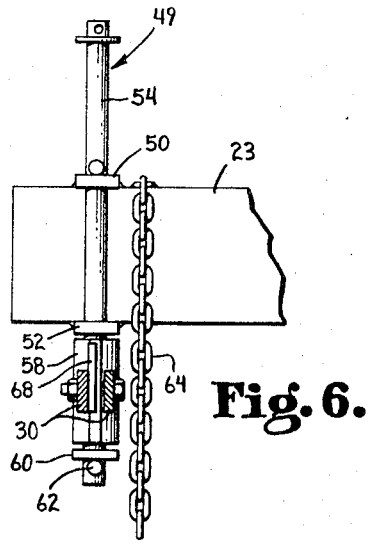
FIG. 6 is a side elevational view of the structure shown in FIG. 5.

A movable connection 49 of the inner hoe-section 24 to the central longitudinal frame-member 23 is illustrated in FIGS. 5 and 6, the hoe-gangs on each side of member 23 being swingable about connection 49 between the positions of FIGS. 1 and 2.

As shown in FIGS. 5 and 6, horizontal plates 50 and 52 are welded to the rear of member 23, along the top and bottom thereof, respectively; and on each side of the member 23, those plates are provided with vertically-registering holes through which is passed a rod 54. Pins 56 extend through the rods 54 to support them by the plate 50. The rods 54 extend substantial distance below the plate 52, for each loosely and rotatably receiving a hinge-bracket 58 secured to the associated inner hoe-section 24. A plate 60, shown similar to the plates 50 and 52, is slipped upwardly along the bottom end of the rods 54, and below the plate 60 pins 62 are passed through the rods 54, supporting the respective hoe-section brackets. Permitting convenient disassembly (as for separation for storage), the pins 54 and the pins 56 and 60 are removable; and when in pinning position, the pins 56 and 60 are desirably provided with retaining means, such as the cotter pins shown.

Figure 10:
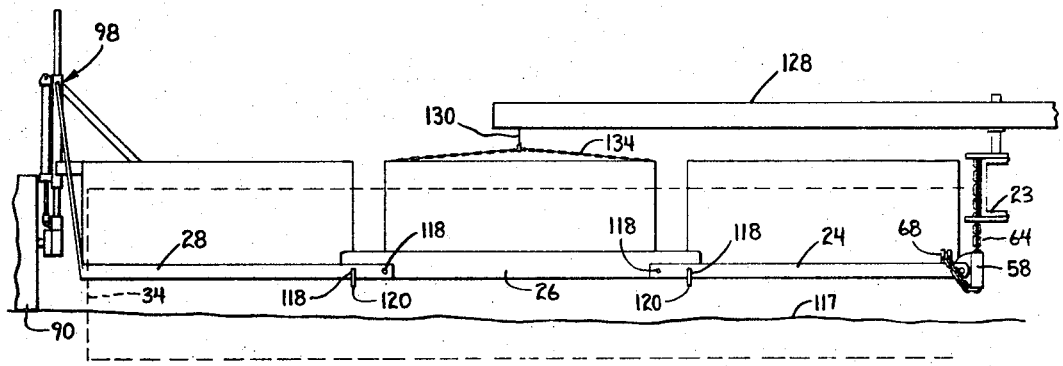
FIG. 10 is an elevational view of the hoe-sections of one side of the hoe-assembly shown in FIG. 9.

If a more-loose support is desired, as for accommodating certain terrain characteristics, an alternate rotatable connection is provided by a chain 64 secured to member 23, which may be passed through the bight of hinge-bracket 58, then passed up and secured by slipping a chain-link into a notch 66 of a bracket 68 welded to an associated frame-member 30 of inner hoe section 24 (as illustrated in FIG. 10).

The front of the hoe 20 is provided with a connection means 70 which may be identical to connection 49 described above, permitting the front of the hoe-gangs to be detached from central frame 23 when they are swung to the retracted position shown in FIG. 2, or as a part of more complete disassembly as for storage.

Support of the hoe-assembly 20 (in addition to that of the tongue 36 and support wheel 40, already described) will now be described.

An inboard, forward hoe-gang support is provided by a wheel 74 (FIGS. 1 and 4) carried on a vertical shaft 76 which is passed through a vertical sleeve 78 supported by frames or braces 80 of inner hoe-section 24. The shaft 76 is provided with holes 82 through a selected one of which is slipped a pin 84 against which the lower end of sleeve 78 bears to support the hoe-gang.

The shaft 76 is rotatable in the sleeve 78, permitting directional-turning of the wheel 74, particularly useful in rotation of the hoe-gangs in and between hoe-operational and retracted position. As indicated in FIG. 4, the sides of the lower end of sleeve 78 are each provided with a downwardly-opening notch 86, located with respect to the relation of the shaft-holes 82 to the plane of wheel 74, such that when the hoe-gangs are in the retracted position (of FIG. 2) the sleeve-notches 86 engage the pin 84 and tend to maintain the wheel 74 in the direction of the tractor-path.

Outer support, at each outer end of the right-hand and left-hand hoe-gang assembly, is provided by a wheel 90 carried on a vertical shaft 92 which is passed through a vertical sleeve 94 supported by frames or braces 96 of the outer hoe-section 28. The shaft 92 is rotatable with respect to sleeve 94, permitting directional-turning of wheel 90, particularly useful in and between hoe-operational and retracted position; and, maintaining the path-direction of the wheel 90 forwardly in either position, the shaft 92 is provided with a lug 93, and the top of the sleeve 94 is provided with recesses 95 spaced ninety degrees apart for alternatively receiving the lug 93, to provide the forward path-direction of the wheel 90 in either position of the said wheel.

An hydraulic means 98 operatively extends between the sleeve 94 and the shaft 92, a collar 100 on the hydraulic means 98 rotatably receiving the shaft 92 but bearing on a shaft-abutment 102 to regulate the relative height of the wheel 90 and the outer hoe-section 28.

A valve 103 in hydraulic line 104 permits the hydraulic fluid to effectively lock the adjustment of hydraulic means 98, permitting the hydraulic pump to be turned off when the desired height-adjustment of the wheel 90 has been achieved.

Additional support is provided by a similar hydraulically-actuated wheel assembly indicated at 105, centrally of the hose 20 at the rear end of the central frame-member 23.

Further support is provided by removable cable guys or chains 106 which extend from the outer hoe-sections 28 to the tractor 22. As shown in FIG. 1, the connection thereof to the tractor 22 is to an arm 108 hinged at 110 to a bracket 112 secured to a side of the tractor, the connection preventing the arm 108 from moving rearwardly of the support-position shown in FIG. 1, but permitting the arm to move forwardly for a purpose now discussed. The bracket 112 is braced by a chain 113 forwardly extending from the outer end of the bracket 112 to the tractor. (In retracted position of the parts, the arm 108 is swung forwardly, as indicated in FIG. 2.)

In turning the tractor 22 (illustratively described will be a left turn), the lack of drawing effort on the left hoe-gangs would permit the guy or chain 106 to become so slack that it might be run over by the hoe 20, with consequent damage. Accordingly, and preventing this slackening of chain 106, a spring 114 (or spring-chain assembly as shown) forwardly extends from an outer portion of arm 108 to the tractor 22. Thus whenever chain 106 would tend to be slack, the spring 114 causes arm 106 to swing forwardly as permitted by hinge 110, taking up the slack, and thus preventing the damage indicated above.

Figure 7:
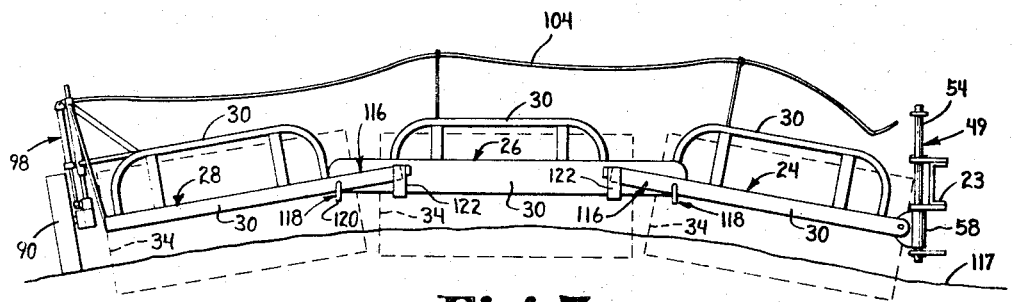
FIG. 7 is an elevational view of the hoe-sections of one side of the hoe assembly, illustrating adaptability to uneven terrain.
Figure 8:
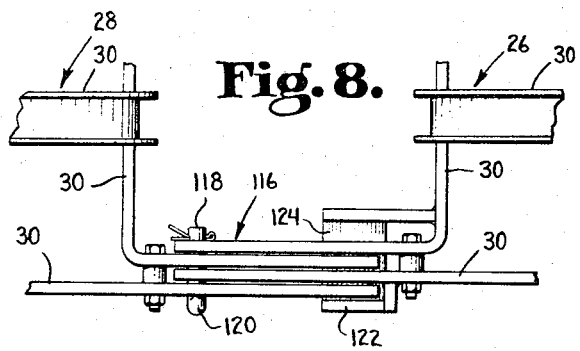
FIG. 8 is a fragmentary view, in enlarged scale, of one of the joints connecting hoe-sections.

FIGS. 7 and 8 illustrate connections 116 between hoe-sections permitting relative upward swinging thereof, to better follow the ground 117 or terrain contours or characteristics. As there shown, a removable, longitudinally-directed horizontal pin 118 (having a handle 120) is passed through aligned openings of pairs of framing 30 of each of hoe-sections. A similar connection 116 exists between hoe-sections 26 and 24; and such connections are provided along both the front and rear portions of the hoe-sections.

The intermediate hoe-section 26 is shown as provided with a bracket 122 which has a horizontal plate 124 engageable by the framing 30 of the outer hoe-section 28; and this limits the upward relative swinging of either the outer hoe-section 28 or the intermediate hoe-section 26; and intermediate section 26 and the inner hoe-section 24 are likewise pivotally interconnected to permit similarly-limited relative swinging of intermediate hoe-section 26 and the inner hoe-section 24. This restriction of the permissive swinging of the respective hoe-sections provides that the intermediate hoe-section 26 is supported by the inner and outer sections 24 and 28 (which are elevated by hydraulically-controlled wheels 90 and 105, respectively) for controlled working-depth operation, even though terrain irregularities are accommodated.

Figure 9:
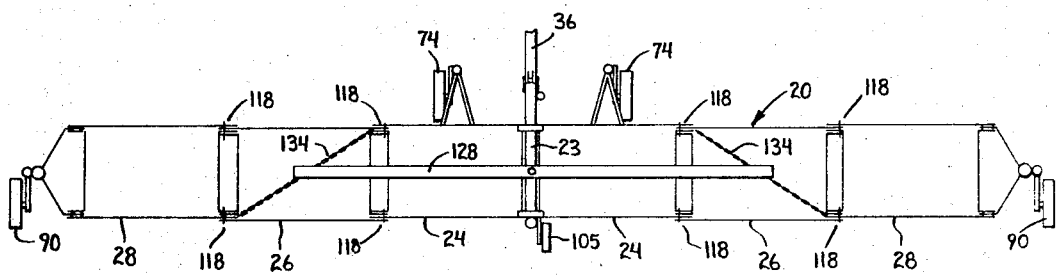
FIG. 9 is a top plan view, more diagrammatical, illustrating modified support means.

FIGS. 9 and 10 illustrate a modified supporting means. As there shown, a beam 128 is pivotally connected to the central frame-member 23, extending perpendicularly thereto when the hoe assembly 20 is in hoe-operational position. At each end of the cross-beam 128 (approximately centered over the intermediate hoe-section 26) a chain 130 extends vertically, having a small clevis or hook 132. This hook 132 supportingly engages a chain 134 which extends from one corner of the intermediate hoe-section 26 to a diagonally opposite corner. This arrangement provides support of the intermediate hoe-section 26 independent of the inner and outer hoe-sections 24 and 28; and rigidity, if desired, is provided by including spaced pins 118 at each connection of hoe-sections, at least one of which pins 118 at each such connection being removable.

This arrangement (FIGS. 9 and 10) which includes the cross-beam 128 and chains 130 and 134, is particularly desirable with the relatively loose central connection employing the chain 64, as described above.

Thus, it will be seen that the present inventive concepts provide a new and useful implement construction and an implement-tractor adaptation and combination, which provides several advantages; novel retractibility of laterally-extending operations members for compactness of travel and/or storage; economy; convenience; ease of adaptation for the different use-situations; desirable characteristics of operation, maneuverability, and change to accommodate the particular use-situation; ruggedness; each of more major disassembly for prolonged storage, and ease of re-assembly; accommodation to uneven terrain; and others inherent in the overall invention described.

Accordingly, from the foregoing description of the invention according to the illustrative embodiments, considered with the accompanying drawings, it is seen that the invention provides a novel and useful device having desirable advantages and characteristics, and accomplishing its intended objects, including those hereinbefore pointed out and others which are inherent in the invention.

It will be understood that modifications and variations may be effected without departing from the scope of the novel concepts of the invention; accordingly, it is to be understood that the invention is not limited to the specific embodiments thereof illustrated and described, or to the specific form or arrangement herein described and shown.

What is claimed is:

1. A rotary hoe attachment for being drawn by an associated vehicle, comprising:
   a central frame;
   hoe-carrying framing extending in a hoe-operational position laterally of said central frame;
   means permitting said hoe-carrying framing to be swung from said laterally-extending position to a retracted position extending generally parallel to said central frame;

the hoe-carrying framing being provided in sections;

connection means interconnecting the adjacent ones of said sections but permitting relative swinging thereof, accommodating to unevenness of terrain;

means limiting the said relative swinging;

support means supporting certain but not all of said sections from the ground;

the said limiting means providing that the nonsupported sections will be supported by said supported sections even though some terrain-accommodation is provided.

2. An implement drawn by an associated vehicle, comprising:

an arm means movably supported by said vehicle, the rearward movement of said arm means being limited to an implement-supporting position;

supporting means interconnecting said arm and said implement;

spring means urging said arm means to a forward nonsupporting position, providing that slack in said supporting means will be taken up by the forward movement of said arm means.

3. An implement drawable by an associated vehicle, comprising:

a frame member;

an operating structure;

pin means pivotally interconnecting said frame member and said operating structure permitting said structure to move between an extended and a retracted position, the pin means including a pin and a pin-receiving bracket means cooperatively carried by the said frame member and the said structure;

a flexible member also carried in association with said pin means and adapted to be passed through said pin-receiving bracket to provide looseness of connection of the frame member and operating structure.

References Cited

UNITED STATES PATENTS

| | | | |
|---|---|---|---|
| 1,441,356 | 1/1923 | Kaupke | 172—386 X |
| 1,864,301 | 6/1932 | Graham | 172—310 |
| 2,377,380 | 6/1945 | Sawtelle et al. | 56—7 |
| 2,547,479 | 4/1951 | Markel | 172—548 |
| 2,747,355 | 5/1956 | Warne | 172—627 X |
| 2,958,383 | 11/1960 | Danielson | 172—626 X |
| 3,070,938 | 1/1963 | Winget | 56—6 |
| 3,162,459 | 12/1964 | Marmorine et al. | 280—413 X |
| 3,321,028 | 5/1967 | Groenke | 172—456 X |

FOREIGN PATENTS

| | | |
|---|---|---|
| 208,782 | 6/1957 | Australia. |
| 352,071 | 3/1921 | Germany. |

OTHER REFERENCES

John Deere Operator's Manual, OM-D45-257, p. 4, relied upon, dated Mar. 25, 1957.

ABRAHAM G. STONE, *Primary Examiner.*

A. F. GUIDA, J. R. OAKS, *Assistant Examiners.*